(12) United States Patent
Yokoyama et al.

(10) Patent No.: US 6,563,087 B1
(45) Date of Patent: May 13, 2003

(54) AUTOMATED SOLDERING SYSTEM

(75) Inventors: Tetsuo Yokoyama, Hannan (JP);
Mitsuhiko Miyazaki, Higashiosaka (JP); Yoshihiro Hagihara, Tondabayashi (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 10/002,876

(22) Filed: Nov. 14, 2001

(51) Int. Cl.$^7$ ................................................ B23K 3/00
(52) U.S. Cl. .......................... 219/240; 219/490; 228/51
(58) Field of Search .................. 219/240, 241, 219/227–229, 490; 228/51, 55

(56) References Cited

U.S. PATENT DOCUMENTS

| | | | | |
|---|---|---|---|---|
| 4,945,210 A | * | 7/1990 | Yoshimura | 219/241 |
| 4,994,655 A | * | 2/1991 | Handa et al. | 219/535 |
| 5,014,210 A | * | 5/1991 | Postlewait et al. | 219/241 |
| 5,208,436 A | * | 5/1993 | Blankenship | 219/121.54 |
| 5,357,076 A | * | 10/1994 | Blankenship | 219/121.54 |
| 5,408,072 A | | 4/1995 | Nagase | |
| 5,911,895 A | * | 6/1999 | Porfido et al. | 219/221 |

FOREIGN PATENT DOCUMENTS

| | | | |
|---|---|---|---|
| DE | 19809083 | * | 9/1998 |
| EP | 879666 | * | 11/1998 |
| JP | 9-210282 | * | 8/1997 |
| WO | 9319563 | * | 9/1993 |
| WO | 9720682 | * | 6/1997 |

* cited by examiner

Primary Examiner—John A. Jeffery
(74) Attorney, Agent, or Firm—Squire, Sanders & Dempsey L.L.P.

(57) ABSTRACT

An automated soldering system with an intelligent power supply that can automatically configure the power output to interchangeable soldering cartridges, where the soldering cartridges include readable information to allow the power supply to properly power the cartridge to achieve a desired, entered operating temperature. The system includes a cartridge with an identifier that contains information particular to that cartridge, a reader able to read that information, and an indicator positioned on a connector into which the cartridge is inserted.

19 Claims, 4 Drawing Sheets

AUTOMATED SOLDERING SYSTEM

BACKGROUND OF THE INVENTION

1. Field of the Invention:

The present invention relates to an automated soldering system with an intelligent power supply that can automatically configure the power output to interchangeable soldering cartridges, where the soldering cartridges include readable information to allow the power supply to properly power the cartridge to achieve a desired, entered operating temperature. In particular, the present invention encompasses the use of an identifier on the cartridges and a reader coupled to the power supply for immediate recognition of the type of soldering cartridge to be used. In addition, to inform the user that the station is operational, a LED indicator preferably located proximate to the interchangeable cartridge and activated by the automated soldering system displays various light signals for the user.

2. General Background and State of the Art:

Soldering stations have been in use for many years. The typical soldering station includes two components: a soldering iron composed of either a connector and a cartridge or a handpiece, a heater and a soldering tip, and a power supply for supplying current to the soldering iron. The cartridges have a soldering tip, which is used to solder, located at one end of the cartridge and a connector at the opposite end which can be inserted into a handle attached to a power cable extending from the power supply. The power cable may have many wires capable of carrying power and information between the power supply and the cartridge.

Various cartridges have different configurations for the tip. Because of the varying configurations, the tip temperature must be optimized for effective soldering. The thermal properties of the various tip configurations as well as the shape and the size of the tip will impact the optimal temperature to solder using that particular tip. Because the tips are integral within the cartridge, each cartridge becomes unique, its power requirements distinguishable only by the type of tip. Therefore, traditional soldering stations, which had only one power output level, did not optimize the functionality of the different cartridge tips available in the market. Further, cartridges with varying tip designs had to be manufactured around the parameters of a particular power supply. The second generation of soldering stations allowed the user to adjust the power output of the power supply using dials and knobs to better define the power required. These adjustable soldering stations could accommodate a far broader range of soldering tip configurations as compared to the traditional soldering stations.

Each soldering process has an optimum temperature which must be maintained within set, often specified, limits for proper soldering. The control dials on the second generation power supplies can be adjusted to provide the appropriate amount of power to obtain this optimal temperature. Before heating elements had sensors built into them, the user would have to measure the tip temperature using special thermometers, then adjust the control dials, then measure the temperature, then adjust the control dials, and so on. Using such an iterative procedure, the user would fine-tune the actual temperature until it equaled the optimal temperature. Later technology incorporated sensors within the tip itself to measure the temperature, thereby eliminating the need for the time-wasting iterative process. Accordingly, soldering stations were developed that could utilize information from sensors located in the cartridge to automatically fine-tune the power output to reach the optimal temperature.

The development of cartridge sensors changed the role of the power supply and the user. The sensors within the cartridge relayed information back to the power supply, and the power supply displayed the temperature on a display. However, even these new technologies encountered serious shortcomings. To begin with, the temperature sensor was not located near the tip surface used for soldering. Instead, the temperature sensor was located near the heating elements inside of the tip. As a result, the sensed temperature of the heating element within the cartridge did not reflect the true temperature of the tip. Second, because of the distance between the sensor and the tip, the temperature gradient between the sensor and the tip could often be steep. Therefore, although the automated procedures may have brought the tip temperature closer to being within range of the optimal tip temperature, the user still had to make manual adjustments and use iterative processes to narrow the range until the actual tip temperature equaled the optimal tip temperature.

Another solution to the temperature differentials was the use of a central processing unit ("CPU") within the power supply to control the temperature of the heating element located inside of the tip. A user would measure the actual tip temperature using a thermometer and then calculate the difference between the actual tip temperature and the temperature setting on the soldering station. This difference was input into the CPU, and the CPU adjusted the power output according to an iterative process or preprogrammed algorithms. Although the user skill level required to measure and to calculate the difference was certainly lower than that required to adjust the dials, the process still expended valuable time.

A more significant issue involved the removal of a cartridge having a given tip configuration from the connector and the replacement with a cartridge having a different tip configuration. This occurs because, during the course of soldering in any given application, the user may need to change the cartridge several times to have the optimal tip configurations. Every time a cartridge is replaced, the user must go through the same iterative procedures discussed above to reach the optimal temperature.

Inefficient time expenditure is not the only unwanted consequence of the present state of the art. For example, if the tip temperature is not adjusted to the proper level, the soldering iron is operable to solder an application or type of solder even though the setting is unsuitable for the application or type of solder. If soldering is performed at an inappropriate temperature, the electronic component to be soldered may be damaged by the excessive heat or the solder connection could be weak if the tip was either not hot enough or too hot. Because several different cartridges and tips could-be utilized during a given soldering procedure, it is probable that a user may solder an application without waiting for the tip to reach the optimal temperature. Even if a CPU is being used to adjust the tip temperature, the difference between the actual temperature and the optimal temperature must be input, until the difference is de minimis. Clearly, performing competent soldering requires the operator to be skilled in the art of temperature adjustment as well as soldering technique. When a significant amount of time is spent adjusting the soldering temperature, the efficiency and cost performance of the soldering process is reduced. This increases the average cost of goods and decreases profit margins.

There is thus a need in the soldering industry to provide an easier and more automated means of adjusting the tip temperature for different tips, as well as a reliable mechanism to inform the operator when the adjustment has been accomplished.

BRIEF SUMMARY OF THE INVENTION

The present invention is directed to a processor-controlled automated soldering system and a method for its operation that determines the characteristics of a particular soldering cartridge tip, adjusts the output power as appropriate and provides signals to the operator to assure adjustment has been accomplished. In particular, the present invention creates an automated system of cartridge recognition, using reader and identifier technology, to preset the power output level of the power supply station. The identifier, which is attached to the cartridge, contains encoded information about the various properties of the cartridge and its tip such as for example the offset value of the tip. A reader associated with the power supply station is able to read the information from the identifier and communicate it to a CPU within the power supply station. The power supply station can thus generate power using the proper offset according to the particular cartridge tip to be used. Also included in the present invention is an output device that displays a first light pattern when the cartridge is not ready to be heated and a different light pattern when the cartridge is ready to use.

Accordingly, an automated soldering system is set forth which includes cartridges capable of storing encoded information in an identifier, a reader having means to read the information in the identifier, a CPU adapted to process various data and match cartridge information with look-up tables, and a power cable having a connector including means of visually displaying signals received from the CPU. An intelligent and automated power supply is thus provided to transmit variable rates of power to power the cartridge.

To use and operate the automated soldering system, an operator first chooses the appropriate cartridge for a given soldering task, each such cartridge having encoded information positioned proximate the end opposite the tip. The operator then sets the desired soldering temperature which is displayed on the soldering station. The identifier end of the cartridge is inserted into a reader in the power stations which reads the information such as the cartridge offset value and transfers it to the CPU. According to the cartridge offset or various look up tables and stored data, the CPU determines the corresponding level of power to be generated to properly heat the respective tip and communicates this information to the power supply to program its output level. Even though the power supply has received instructions to supply power, it will not initiate power generation until a closed circuit is established, which indicates that the cartridge has been properly inserted into the connector of the power cable.

An LED indicator located on the connector blinks on and off if the power supply is on and a cartridge has not been inserted into the reader. Once a cartridge is inserted into the reader and its information is obtained, the LED indicator turns on to indicate that the power supply is calibrated.

If the cartridge is disconnected from the connector of the power cable, the resulting open circuit will cause the power supply to reset and the LED indicator located on the connector blinks on and off. To reinitiate power generation, the procedure detailed above must be followed with the same or a different cartridge.

The above described and many other features and attendant advantages of the present invention will become apparent from a consideration of the following detailed description in conjunction with the accompanying drawings.

BRIEF DESCRIPTION OF THE DRAWINGS

A detailed description of the invention will be made with reference to the accompanying drawings wherein:

FIG. 5 is a frontal view of the reader on the power supply;

DETAILED DESCRIPTION OF THE INVENTION

Figure 1:
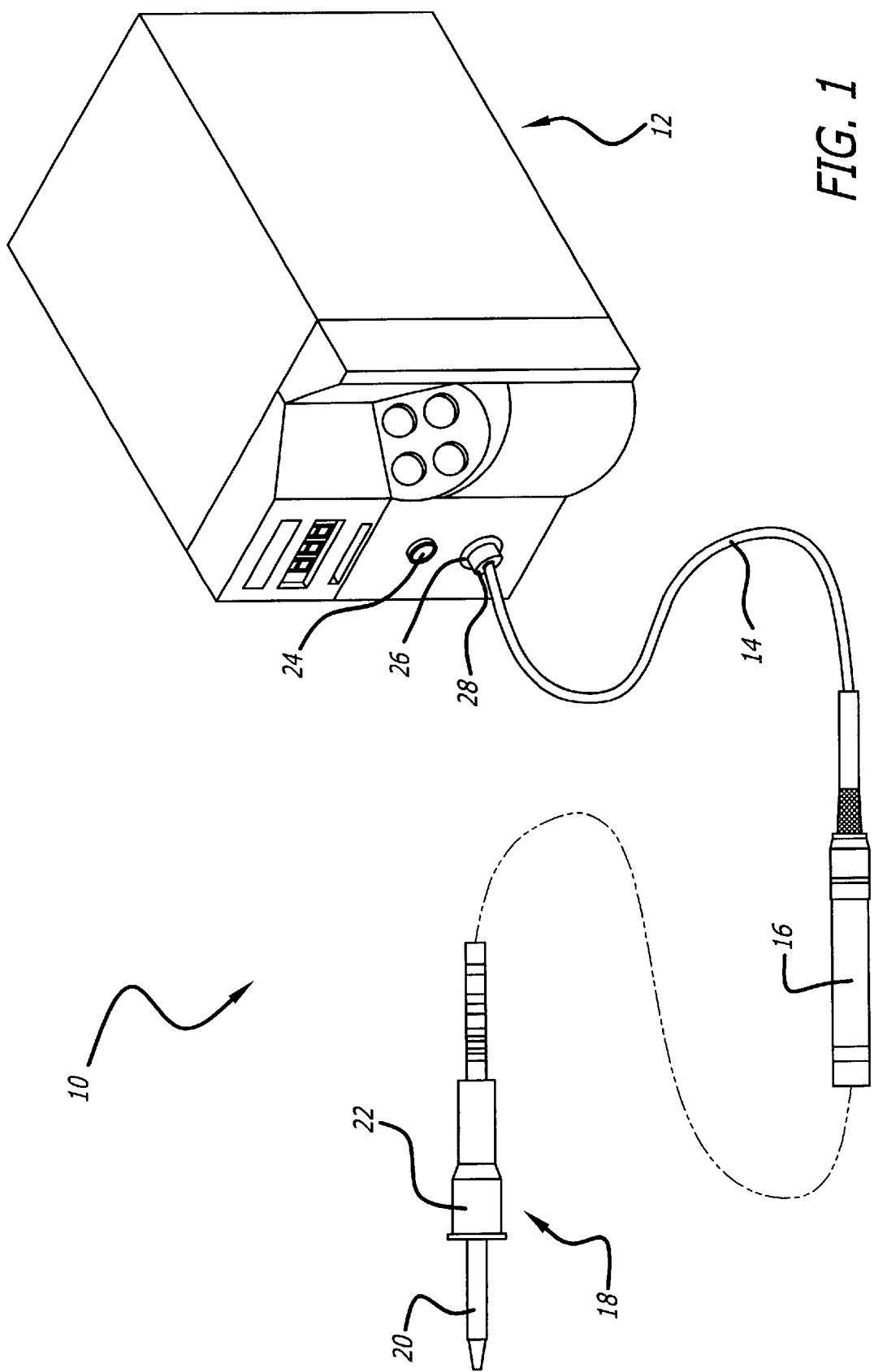
FIG. 1 shows a perspective view of the soldering system including a cartridge assembly, power supply, a reader and a power cable coupling the cartridge to the power supply.

FIG. 1 depicts a perspective view of an automated soldering system 10 according to the present invention. The automated soldering system 10 includes a power supply 12 that supplies current and power to a soldering cartridge 20 through a power cable 14 terminating at a connector 16. The power cable 14 couples the cartridge 20, inserted into the connector 16 located at the proximal end of the power cable 14, with the power supply 12. Inside the power cable 14 are numerous individual wires, each coated with insulation, bundled together and wrapped with a plastic or rubber sheath. Attached to the distal end of the power cable 14 is an electrical connector 28 that has pins (not shown), each associated with a wire inside of the power cable 14. The electrical connector 28 connects to a coupling jack 26 located on the power supply 12. The end opposite the electrical connector 28 is adapted to receive a cartridge assembly 18, which includes a handle 22 and the cartridge 20. The power supply 12 contains a reader 24 equipped to read and decode information provided by an identifier (as described below) on the cartridge 20.

Figure 2:
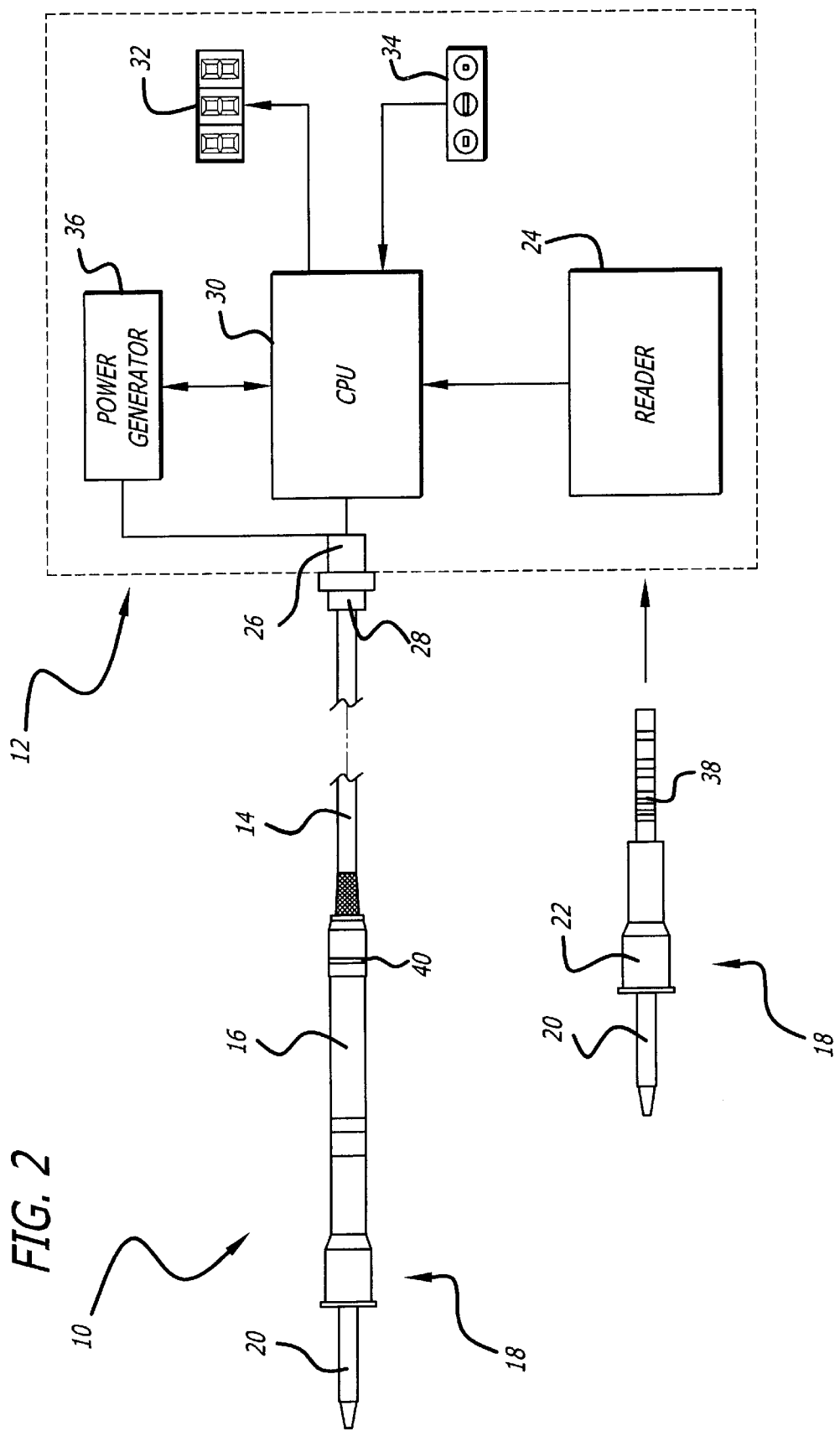
FIG. 2 is a block diagram indicating the flow of information within the soldering system of FIG. 1.

FIG. 2, a block diagram of the preferred embodiment, depicts the particular components within the power supply 12 of the automated soldering station 10. The power supply 12 includes a central processing unit or CPU 30, a temperature display 32, temperature set point dials 34, and a power generator 36 in addition to the reader such as a bar code reader 24.

Figure 3:
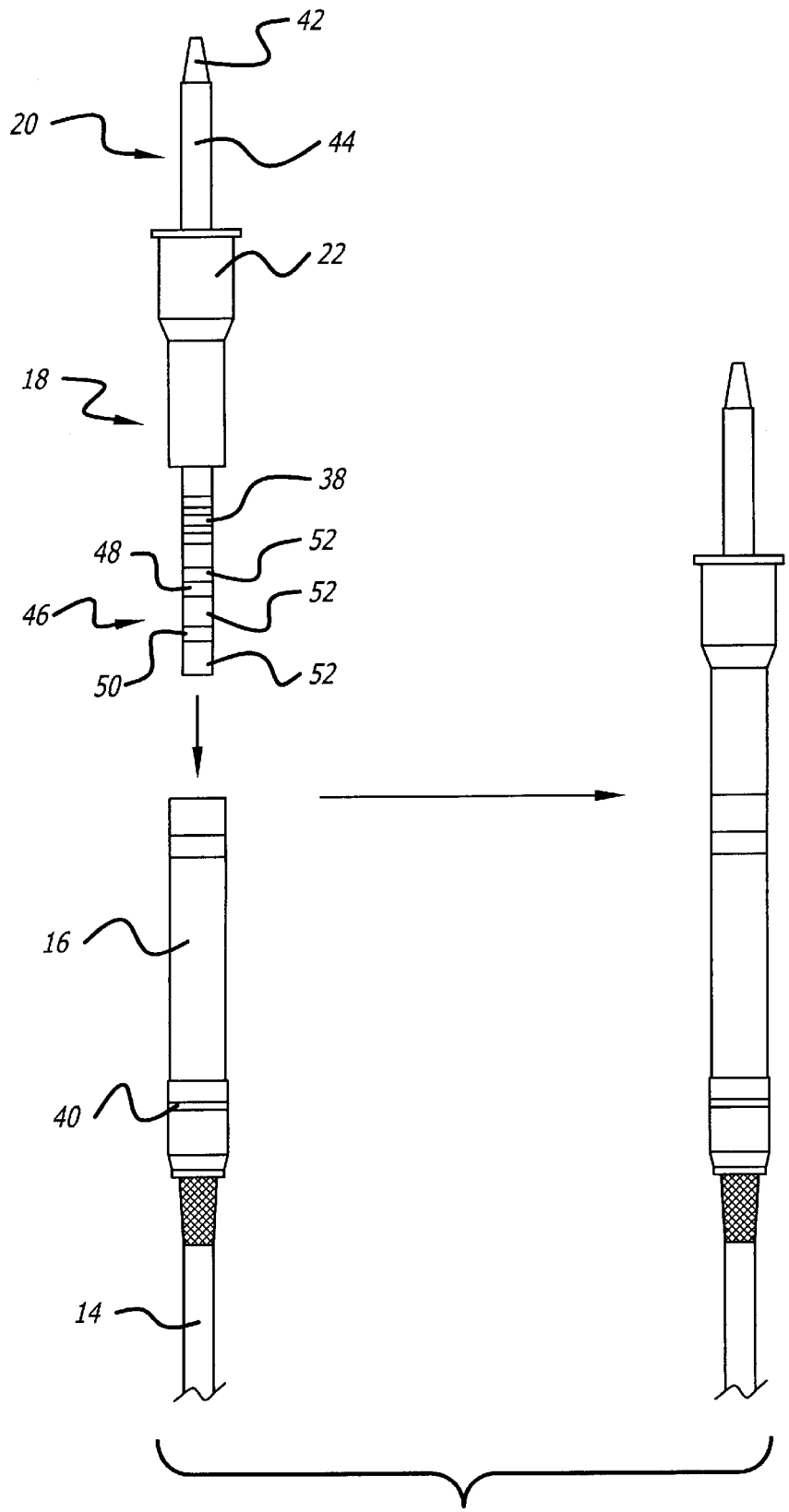
FIG. 3 depicts the cartridge, handle assembly and connector of the power cable.

As illustrated in FIG. 3, the cartridge assembly 18 includes the handle 22 which removably slides onto the cartridge 20. The cartridge 20 has three main visible components: a tip 42, a cylindrically shaped housing 44 and a contact area 46 which includes electrical contacts 48 and 50 separated from the housing 44 and from each other by cylindrical insulators 52. As depicted in FIG. 3, this cartridge 20 also includes an identifier, which is depicted as being a bar code 38. Within the cartridge 20, wires connected at one end to respective terminals on the inside of the electrical contacts 48, 50 extend through the housing 44 to a heating wire within a heating element or a sensor insider of the tip 42.

The bar code 38 provides a readable code or information about the particular cartridge 20. In the preferred embodiment, the bar code 38 provides at least an offset value or a product identification number for the particular cartridge 20. The reader 24 is able to read the information from the identifier 38 and transmits it to the CPU 30. The CPU 30 has various lookup tables that store many cartridge identification numbers and corresponding power generation levels.

To inform the CPU 30 that the user wants to use the soldering station 10, the identifier end of the cartridge assembly 18 is inserted in the reader 24. In response to the information provided by the reader 24, the CPU 30 compares the cartridge information with data stored in the look-up tables. If the CPU 30 does not recognize the cartridge 20, a LED indicator 40 will display a corresponding signal to inform the user to reinsert a known cartridge 20. If the CPU 30 recognizes the cartridge 20, the CPU 30 directs the power supply 12 to begin a power generation sequence and the LED indicator 40 will display a signal indicating recognition of the cartridge 20. The power supply 12 provides a variable current and/or manipulates the number of current pulses in a given period to appropriately energize the cartridge. An indicator on the power supply 12 will display a signal corresponding to the recognition by the CPU 30 that the cartridge has been appropriately energized to the point where the tip has reached its optimal temperature.

To ensure safety and conserve energy, the power generator 36 will not transmit current to the cartridge 20 until the circuit including the power supply 12, the connector 16 and the cartridge 20 is closed. The complete insertion of the cartridge 20 into the connector 16 will close the circuit and trigger a flow of current from the power generator 36 to the cartridge 20 through the power cable 14. A heating element within the tip 42 of the cartridge 20 generates heat. A temperature sensor inside the tip 42 of the cartridge 20 will transmit temperature data to the CPU 30 through the power cable 14. The temperature display 32 on the power supply 12 will show the desired tip temperature. The user can adjust the desired tip temperature using the set point dials 34 to provide a signal to the CPU 30 if the user desires a specific temperature and the offset information obtained by the reader 24 from the cartridge 20 provides the offset information to adjust the CPU 30 to adjust the output to the cartridge 20.

Once the cartridge 20 has been inserted into the reader 24, the LED indicator 40 will be continuously lit to provide a visual cue to the operator. The light signal informs the user that the power supply 12 is programmed for the soldering cartridge 20 and the power supply 12 is in use. If the user removes the cartridge 20 from the connector 16, the CPU 30 will recognize that the circuit has been broken and reset the power generator 36. The LED indicator 40 will blink on and off and current will not flow through the connector 16 until the user reinitiates the sequence described above, i.e. inserting an identifiable cartridge 20 into the reader 24 and then inserting the same cartridge 20 into the connector 16. The same steps must be followed if the user wants to reuse a removed cartridge 20 or replace it with a new cartridge 20 during the course of soldering in any application.

The tip 42 of the cartridge 20 can come in many shapes and sizes to accommodate the various demands of soldering technique. Inside the tip 42 is a heating mechanism that is known in the art. Heating mechanisms also contain various temperature sensors in addition to many heating elements. When the cartridge 20 receives power from the connector 16, the cartridge 20 will become hot from the heat generated within the tip 42. The housing 44 of the cartridge 20 protects the wires (not shown) connecting the electrical contacts 48 and 50 in the contact area 46 of the cartridge 20 to heating mechanisms inside the tip 42.

The type and location of the identifier such as the bar code 38 on the cartridge 20 will depend on parameters particular to the technology used. In the preferred embodiment, the identifier is the bar code 38. The bar code 38 is preferably located near the distal end of the housing 44 to minimize the harmful effects from the heat generated inside the tip 42. In alternative embodiments, the constraints of the particular technology used for the identifier may require a different placement. Moreover, the identifier could utilize other technologies such as optical scanning, magnetism, RFID, memory devices, or other contact and contact-less means to transfer information to an appropriate reader associated with the power supply 12.

It should be noted that a user could insert either the cartridge 20 by itself or the cartridge assembly 18 into the reader 24 in the preferred embodiment. However, as a practical matter and for safety reasons, it is preferable if the user does not physically touch the cartridge 20. This prevents contamination of the cartridge 20 with oils and moisture from human contact. It is preferred if the user grips the handle 22 to manipulate the cartridge 20.

The LED indicator 40 is not restricted to its limitations in the preferred embodiment. In the preferred embodiment, the LED indicator 40 includes a light emitting diode ("LED") (as described below) located within the connector 16. In alternative embodiments, the LED indicator 40 can include various colored diodes, where each color and each color pattern has an associated meaning. For example, a green light could mean that the cartridge 20 is ready to use, whereas a red light could mean that the CPU 30 has not recognized the identifier 38 and/or that the power supply 12 has not begun transmission of power to the connector 16. It is also contemplated that various blinking and other on/off patterns could be used to display information. Also, it is not absolutely necessary to use diodes in the LED indicator 40. Other light producing mechanisms such as fiber optics can be used to display light patterns. The location of the LED indicator 40 does not necessarily need to be within the connector 16, as long as the LED indicator 40 is located someplace on the soldering system 10 where it is visible to the operator, the exact location is variable.

Figure 4:
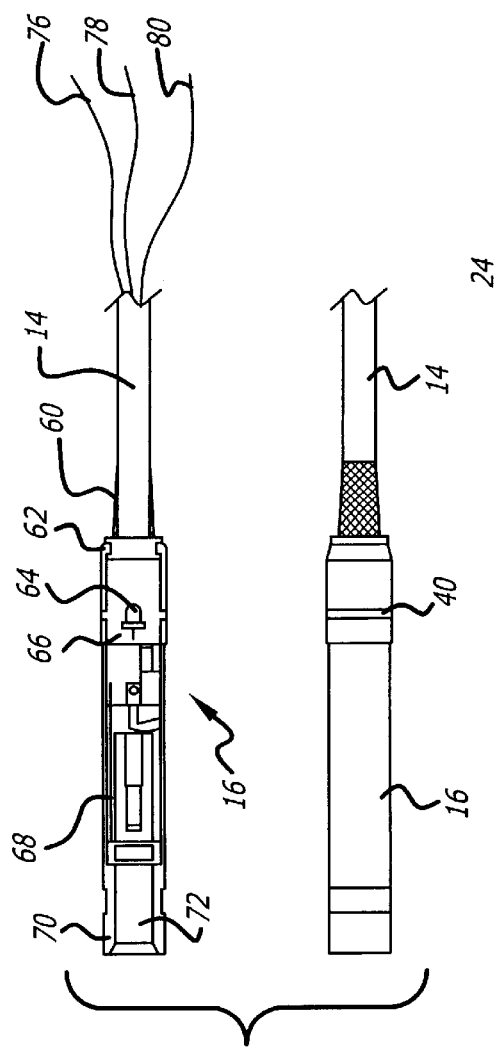
FIG. 4 is a side and partial cross-sectional view of the connector.

FIG. 4 depicts a cross-sectional view and a side view of the connector 16 of the power cable 14. The connector 16 has a cylindrical sleeve 62 which slopes inward to seal against the insulator of the power cable 14. A cord bush 60 may be inserted between the cylindrical sleeve 62 and the insulator of power cable 14 to ensure that the power cable 14 is not easily removable from the connector 16. A first wire 76 from within the power cable 14 is connected to a LED 64. Additional wires 78 and 80 connect to the pair of wiping contacts 68 that supply current to electrical contacts 48 and 50 on the cartridge 20. The LED 64 is positioned within an indicator window 66. The LED 64 and the LED indicator window 66 form the LED indicator 40. The LED 64 turns on and off according to the signals sent from the CPU 30. The cylindrical sleeve 62 extends past the LED 64 to an end 70 defining a cylindrical opening 72 adapted to accept the contact area 46 of the cartridge assembly 20. The cylindrical sleeve 62 is preferably made of a hard, non-flexible material designed to insulate the outside grip area.

Figure 7:
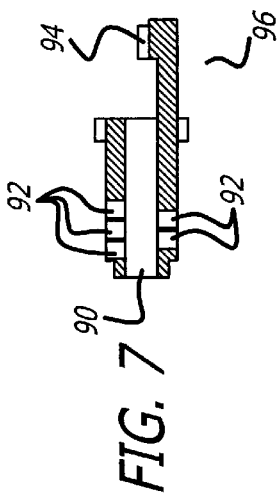
FIG. 7 is a cross-sectional view of the reader depicting the sensors and switch inside of the power supply.
Figure 6:
FIG. 6 is a side view of the reader of the power supply.

FIGS. 5, 6, and 7 depict a front view, side view and cross-sectional view of the reader 24 respectively. The reader 24 includes an opening 90 into which a cartridge assembly 18 is at inserted. The internal components of the reader 24, which are best illustrated in FIG. 7, include a plurality of sensors 92 and a tip sensor switch 94 mounted in an assembly 96. In the exemplary embodiment, the sensors 92 are simple bar code detectors, one sensor for each potential line of bar code. In alternative embodiments, only one sensor may be necessary or the sensors may use different technology, such as optical scanners, magnetics, RFID, memory devices, or other contact and contact-less means to receive information from the identifier. The tip sensor switch 94 detects whether the cartridge assembly 18 has been fully inserted into the reader 24 and triggers the actuation of sensors 92.

Figure 9:
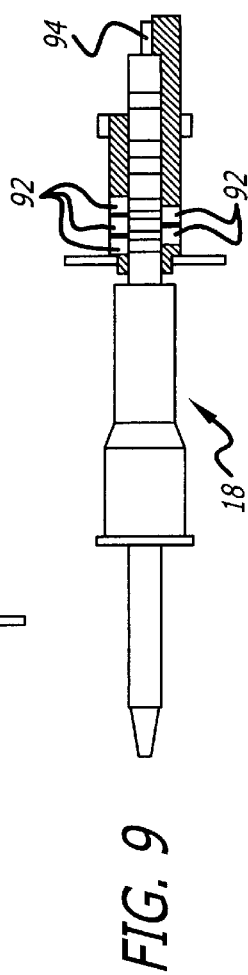
FIG. 9 shows a cartridge inserted into a cross-sectional view of the reader.
Figure 8:
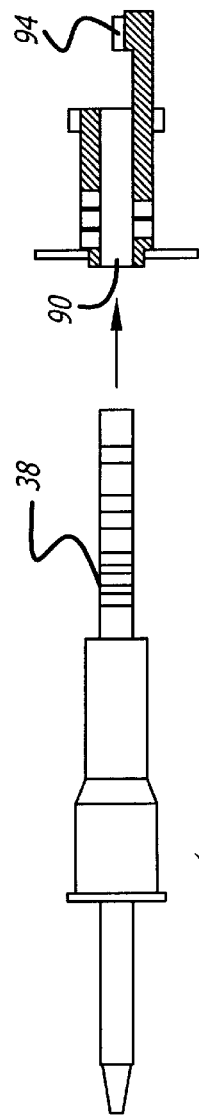
FIG. 8 shows a cartridge just before it is inserted into a cross-sectional view of the reader.

As shown in FIGS. 8 and 9, the contact area 46 of cartridge 20 of the cartridge assembly 18 is inserted into the reader 24 opening 90 until the end of the cartridge 20 triggers the tip sensor switch 94. Once the tip sensor switch 94 is activated as depicted in FIG. 9, the sensors 92 begin transmitting information to the CPU 30. If the cartridge assembly 18 is removed, the tip sensor switch 94 is deactivated, which further deactivates the sensors 92.

In the preferred embodiment, the reader 24 is located in the power supply 12. However, in alternative embodiments, the reader 24 can be located anywhere within the soldering system 10 as long as there is a means of communication for the data received by the reader 24 and transmitted to the CPU of the power supply 12.

Having thus described different embodiments of the invention, other variations and embodiments that do not depart from the spirit of the invention will become readily apparent to those skilled in the art. The scope of the present invention is thus not limited to any one particular embodiment, but is instead set forth in the appended claims and the legal equivalents thereof.

What is claimed is:

1. A soldering system comprising:
    at least one soldering cartridge having a soldering tip and an identifier to identify the power requirements of said soldering tip;
    a power supply to provide power to said at least one soldering cartridge, said power supply being capable of generating variable levels of power for different soldering cartridges; and
    an identifier reader communicatively coupled to said power supply and capable of reading said identifier of said at least one soldering cartridge to obtain and provide information about the power requirements of said soldering tip to said power supply.

2. The soldering system of claim 1, further comprising:
    a power cable to couple said at least one soldering cartridge to said power supply.

3. The soldering system of claim 1, wherein said identifier on said at least one soldering cartridge is a bar code.

4. The soldering system of claim 3, wherein said reader coupled to said power supply is a bar code reader.

5. The soldering system of claim 1, further comprising:
    means for monitoring the temperature of said soldering tip and adjusting the power output level of said power supply to a preset temperature for said soldering tip.

6. The soldering system of claim 1, wherein said power supply uses information from said identifier to determine the appropriate level of power to be provided to said soldering cartridge.

7. The soldering system of claim 1, wherein said power supply further comprises:
    means for retrieving data on said at least one cartridge based upon information provided by said identifier.

8. The soldering system of claim 1, wherein said power supply further comprises:
    means for converting data from said identifier into instructions for said power supply to control the power output of said power supply.

9. The soldering system of claim 1, further comprising:
    an elongated conductor cable having at least two electrical conductors extending from a first end to a second end;
    a connector coupled to said first end of said conductor cable, said connector adapted to receive the soldering cartridge;
    a display element to provide an indication of an operational parameter of the soldering cartridge; and
    an electrical connector coupled to said second end of said conductor cable, said electrical connector including contacts attached to respective of said at least two electrical conductors to couple said power cable to the power supply.

10. A power cable for use in a soldering system to couple a soldering cartridge to a power supply, said power cable comprising:
    an elongated conductor cable having at least two electrical conductors extending from a first end to a second end;
    a connector coupled to said first end of said conductor cable, said connector adapted to receive the soldering cartridge;
    a display element to provide an indication of an operational parameter of the soldering cartridge; and
    an electrical connector coupled to said second end of said conductor cable, said electrical connector including contacts attached to respective of said at least two electrical conductors to couple said power cable to the power supply; and
    wherein said display element is located on said connector.

11. The power cable of claim 10, wherein said display element is a light emitting diode.

12. The power cable of claim 10, wherein said display element further comprises:
    means for displaying various signals received from said power supply corresponding to the operational parameter of the soldering cartridge.

13. The power cable of claim 10, wherein said power cable further comprises a wire adapted to bi-directionally transfer information between the soldering cartridge and the power supply.

14. The power cable of claim 10, wherein said power cable further comprises:
    a pair of wires capable of transferring current from said power supply to said soldering cartridge.

15. A soldering iron cartridge capable of communicateably coupling to a power supply, comprising:
    a tip;
    an identifier corresponding to the tip; and
    a soldering iron cartridge having an end with the identifier capable of being inserted into the power supply to provide information about the power requirements of the tip to the power supply.

16. The soldering iron cartridge of claim 15, where the identifier is a bar code.

17. The soldering iron cartridge of claim 15, further including a handle between the tip and the identifier.

18. A soldering cartridge capable of communicating with a power supply, comprising:
    a tip;
    an identifier corresponding to the tip; and
    a soldering cartridge having the identifier capable of directly communicating with the power supply to provide information about the power requirements of the tip to the power supply.

19. A power cable for coupling a soldering cartridge to a power supply, said power cable comprising:
    a conductor cable having a first end to a second end;
    a connector coupled to said first end of said conductor cable, said connector adapted to receive the soldering cartridge;
    a display element positioned on said connector to provide an indication of an operational parameter of the soldering cartridge; and
    an electrical connector coupled to said second end of said conductor cable, said electrical connector adapted to couple said power cable to the power supply.

* * * * *